United States Patent
Dewar et al.

[11] Patent Number: 5,803,539
[45] Date of Patent: Sep. 8, 1998

[54] AUTO SEAT COVER

[75] Inventors: Sam D. Dewar, Ft. Lauderdale; Joseph Kavana, North Miami; Randolph J. Sanchez, Pembroke Pines, all of Fla.

[73] Assignee: Sagaz Industries, Inc., Miami, Fla.

[21] Appl. No.: 877,274

[22] Filed: Jun. 17, 1997

[51] Int. Cl.⁶ .................................................. A47C 31/11
[52] U.S. Cl. ............................... 297/228.12; 297/228.1; 297/228.13; 297/DIG. 6
[58] Field of Search ............................ 297/219.1, 228.1, 297/228.12, 228.13, DIG. 6; 24/306, 442

[56] References Cited

U.S. PATENT DOCUMENTS

| | | | |
|---|---|---|---|
| 1,619,556 | 3/1927 | Aaron | 297/228.1 |
| 1,882,169 | 10/1932 | Wedler | 297/228.12 |
| 2,900,012 | 8/1959 | McGlone . | |
| 3,479,085 | 11/1969 | Weinstein | 297/228.1 |
| 3,804,457 | 4/1974 | Hellman | 297/219.1 |
| 4,232,898 | 11/1980 | Bodrero | 297/228.1 |
| 4,282,657 | 8/1981 | Antonious | 24/306 X |
| 4,400,030 | 8/1983 | Maruzzo et al. . | |
| 4,693,511 | 9/1987 | Seltzer et al. | 297/228.1 |
| 5,028,472 | 7/1991 | Gray . | |
| 5,234,252 | 8/1993 | Wallach . | |
| 5,441,789 | 8/1995 | Walker . | |
| 5,533,787 | 7/1996 | Xiang . | |

*Primary Examiner*—Peter R. Brown
*Attorney, Agent, or Firm*—Howard & Howard

[57] ABSTRACT

An auto seat cover (14 or 16) comprising a cover portion (18 or 20) having first and second ends interconnected by side edges with an end portion (22 or 24) extending about the first end and first (26 or 28) and second (30 or 32) side portions extending along the side edges of the cover portion (18 or 20). A strap means interconnects the second end of the cover portion (18 or 20) and the side portions (26 or 28, 30 or 32) for retaining the seat cover (14 or 16) in place on an auto seat. The strap means is characterized by the combination of a buckle strap (34) and a buckle (36) attached to the buckle strap (34), a lap strap (38) having a free end (40) for threading through the buckle (36) and a working length (42) extending to the buckle (36) for tightening whereby the buckle strap (34) and the working length (42) of the lap strap (38) may be placed in tension to retain the seat cover (14 or 16) on the auto seat, and pile fastening structure (44) for securing the free end (40) of the lap strap (38) to the working length (42) of the lap strap (38).

8 Claims, 3 Drawing Sheets

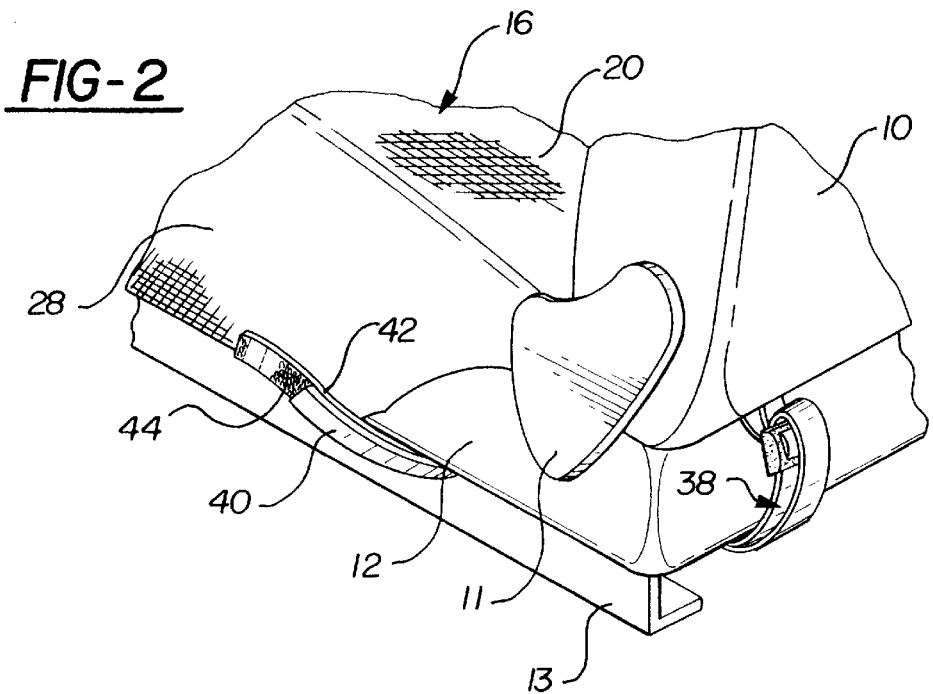
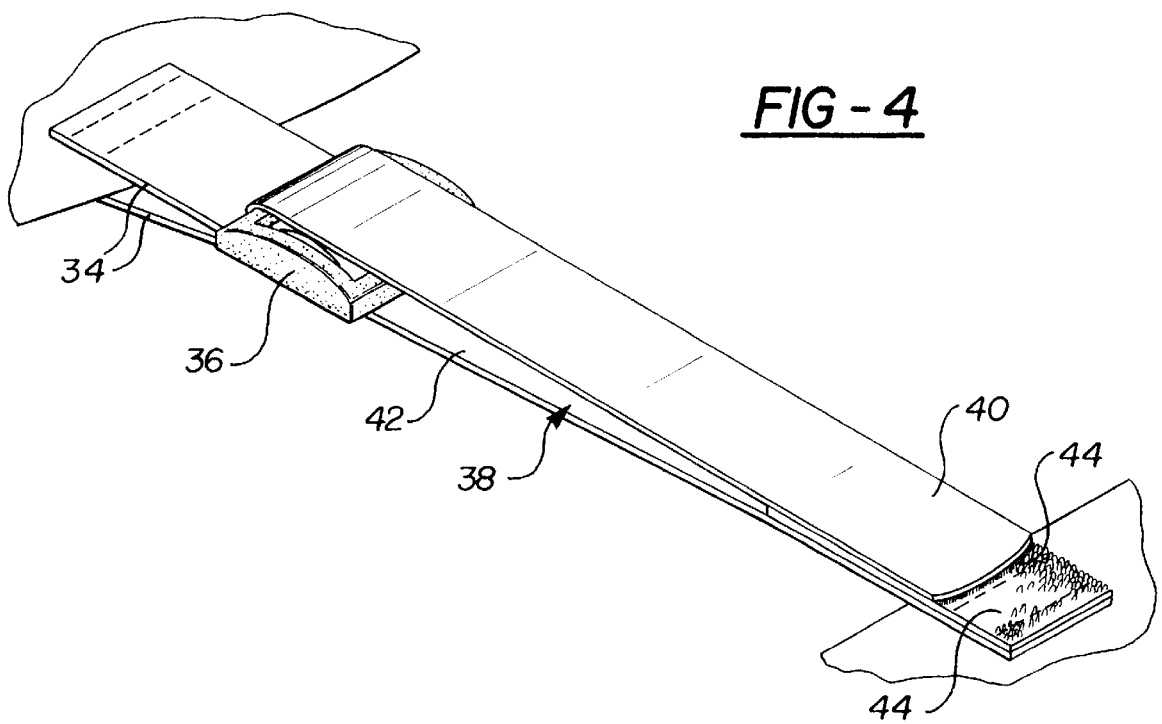

AUTO SEAT COVER

BACKGROUND OF THE INVENTION

1. Field of the Invention

The subject invention relates to seat covers for automotive seats.

2. Description of the Prior Art

The prior art is replete with various combinations in seat cover designs. For example, the bag-like full covers shown in U.S. Pat. Nos. 4,400,030 to Maruzzo; 4,693,511 to Selter et al.; 5,234,789 to Wallach; and 5,533,787 to Xiang. In addition, these prior art patents disclose various ties, straps, buckles, and adhesive devices for securing the covers on the seat. Further examples are disclosed in U.S. Pat. Nos. 2,900,012 to McGlone; 5,028,472 to Gray and 5,441,789 to Walker.

However, there always remains a need for alternative combinations.

SUMMARY OF THE INVENTION AND ADVANTAGES

An auto seat cover comprising a cover portion having first and second ends interconnected by side edges with an end portion extending about the first end and first and second side portions extending along the side edges of the cover portion. A strap means interconnects the second end of the cover portion and the side portions for retaining the seat cover in place on an auto seat. The strap means is characterized by the combination of a buckle strap and a buckle attached to the buckle strap, a lap strap having a free end for threading through the buckle and a working length extending to the buckle for tightening whereby the buckle strap and the working length of the lap strap may be placed in tension to retain the seat cover on the auto seat, and pile fastening structure for securing the free end of the lap strap to the working length of the lap strap.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a fragmentary perspective view of a seat cushion and seat back with the cushion cover in place;

FIG. 4 is a fragmentary perspective view of a seat cushion and seat back with the seat back cover in place.

DETAILED DESCRIPTION OF THE PREFERRED EMBODIMENT

Figure 1:
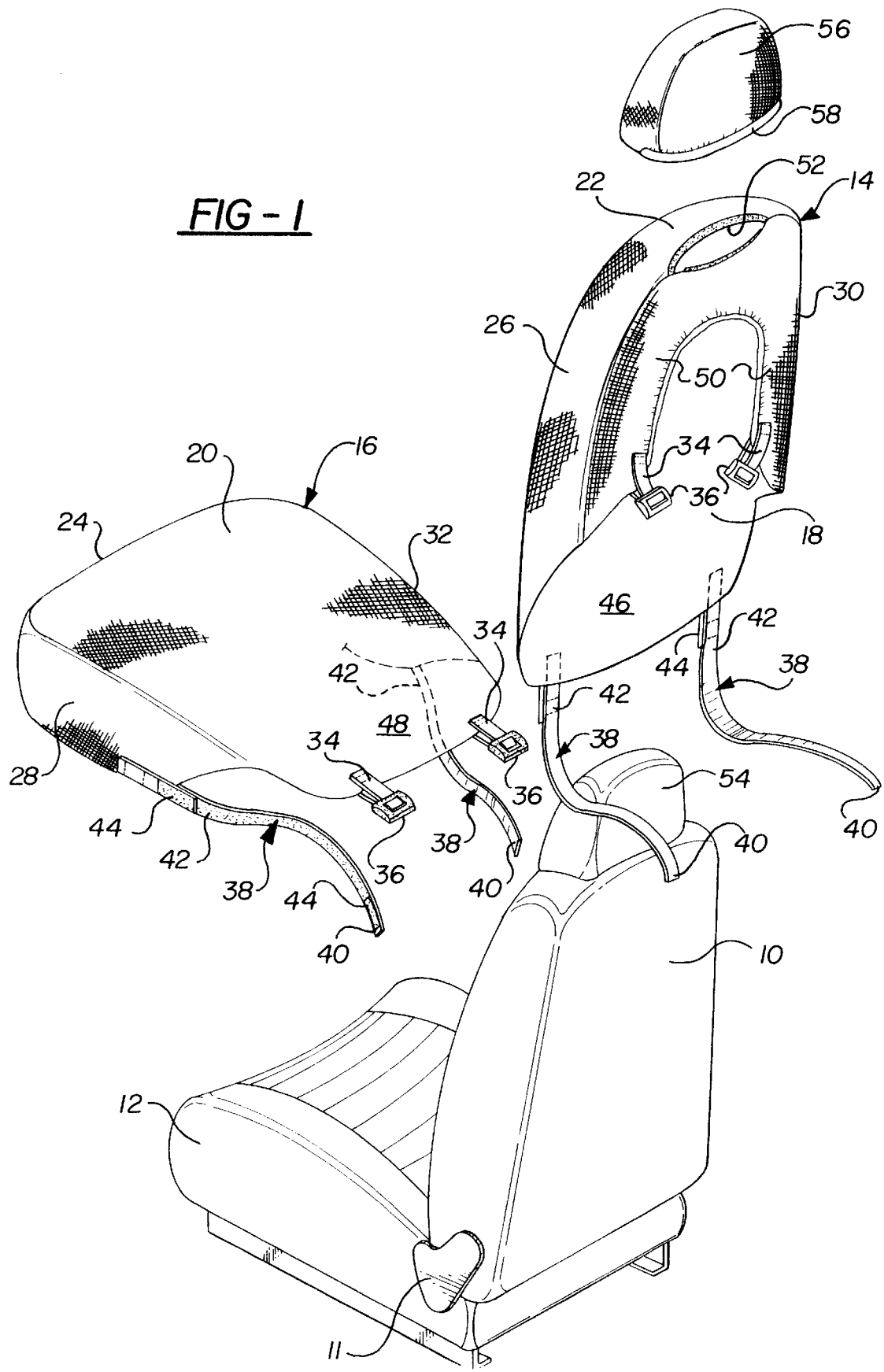
FIG. 1 is an exploded perspective view of a preferred embodiment of the subject invention.

Referring to the Figures, wherein like numerals indicate like or corresponding parts throughout the several views, an automotive seat assembly is shown and includes a seat back 10 and a seat cushion 12 connected together by a bracket or hinge 11 and supported on a frame or track 13. A crevice or tight passage is disposed between the seat back 10 and the seat cushion 12, as is well known. An auto seat cover for a seat back, i.e., a back cover, is generally indicated at 14 whereas an auto seat cover for a seat cushion, i.e., a cushion cover, is generally indicated at 16.

The back cover 14 and the seat cover 16 each include a respective cover portion 18 and 20. Each cover portion 18 and 20 is defined by first and second ends interconnected by side edges. An end portion 22 and 24 extends about the respective first ends and into first 26 and 28 and second 30 and 32 side portions extending along the side edges of the respective cover portions 18 and 20.

Strap means interconnect the second end of the cover portions 18 and 20 and the side portions 26 and 28, 30 and 32 for retaining the seat covers 14 and 16 in place on the back 10 and cushion 12 respectively of an auto seat. The strap means is characterized by the combination of a buckle strap 34 and a buckle 36 attached to the buckle strap 34 and a lap strap, generally indicated at 38, having a free end 40 for threading through the buckle 36 and a working length 42 extending to the buckle 36 for tightening whereby the buckle strap 34 and the working length 42 of the lap strap 38 may be placed in tension to retain the seat cover on the auto seat.

The combination includes a pile fastening structure 44 for securing the free end of the lap strap 38 to the working length 42 of the lap strap 38. The pile fastening structure 44 includes a plurality of pile loops on one of the working length 42 and the free end 40 of the lap strap and a plurality of pile hooks on the other of the working length 42 and the free end 40 of the lap strap 38, the pile hooks being removably fastenable to the pile loops. For example, the pile fastening structure 44 may be the fastening combination marketed under the trademark VELCRO®.

The second ends of each of the cover portions 18 and 20 define flaps 46 and 48 respectively for extending through a crevice between the seat back 10 and seat bottom or cushion 12 of an auto seat assembly.

In the case of the seat cushion cover 12, a pair of the buckles 36 and a pair of the buckle straps 38 are attached at spaced positions to the flap 48 at the second end of the cover portion 20. Accordingly, a first pair of the lap straps 38 are included with a first of the lap straps 38 having the working length 42 thereof attached to the first side portion 28 and a second of the lap straps 38 having the working length thereof attached to the second side portion 32. The side portions 28 and 30 define an open bottom and have exterior surfaces with the side portions 28 and 32 being spaced from the second end defining said flap 48, i.e., the side portions 28 and 32 are scalloped. The working lengths 42 of the lap straps 38 are attached to the exterior surfaces of the side portions 28 and 32. Either one of the hook and loop piles are disposed on each of the working lengths 42 and face outwardly of the exterior surfaces. The free ends 40 of the first pair of lap straps 38 are threaded around the bottom of the seat cushion 12 and through the buckles 36 to lap back over the working lengths 42 to engage the pile loops with the pile tabs to secure the free ends 40 to the exterior faces of the working lengths 42, as illustrated in FIG. 2.

Figure 3:
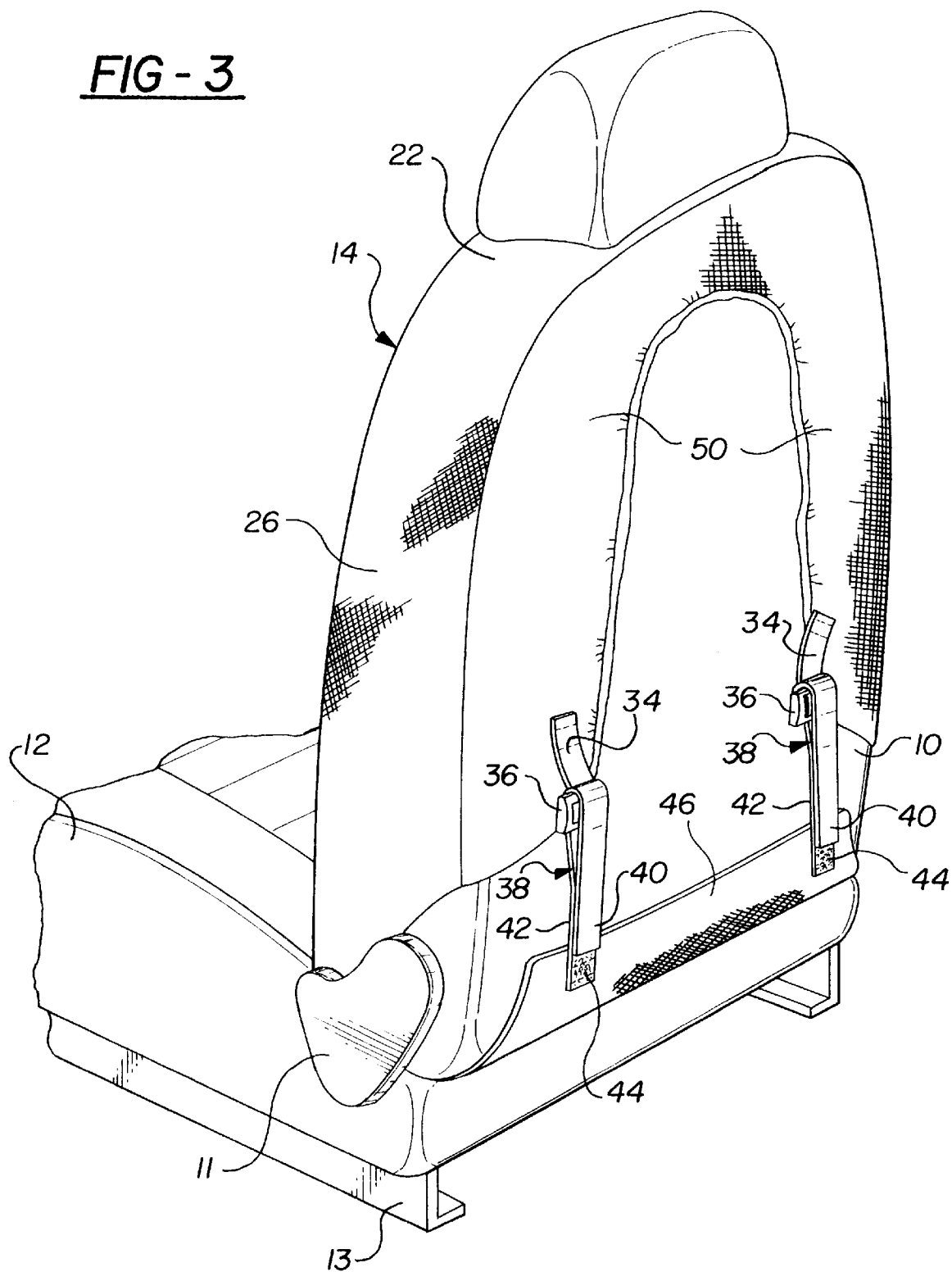
FIG. 3 is a perspective view showing the strap and buckle combination of the subject invention.

However, the seat back cover includes a U-shaped back portion 50 extending about the end portion 22 with legs extending along the side portions 26 and 30 to open ends. A second pair of the buckle straps 34 and a second pair of the buckles 36 are included with one of the buckle straps 34 attached to each of the open ends of the legs of the U-shaped portion 50. A first of the lap straps 34 for the seat cushion cover 16 has the working length 42 thereof attached to the flap 46 of the back cover 14 and in spaced relationship to a second of the lap straps 34 for the seat back cover 14 which also has its working length 42 attached to the flap 46 of the back cover 14. The cover portion 18 of the seat back cover 14 has an exterior surface to which the working lengths 42 are attached. Either one of the hook and loop piles are disposed on each of the working lengths 42 and face outwardly of the exterior surface of the cover portion 18. Accordingly, the free ends 40 of the lap straps 38 are threaded through the crevice between the seat back 10 and seat cushion 12 and through the buckles 36 at the bottom of the legs of the U-shaped back 50 to be lapped over the working lengths 42 to engage the pile loops with the pile tabs to secure the free ends 40 to the exterior faces of the working lengths 42, as illustrated in FIG. 3. Thus, the strap means interconnects the cover portion 18 and the side portions 26 and 30 through the flap 46 and the bottom of the legs of the U-shaped back portion 50. The side portions 28 and 30 are also scalloped whereby the flap 48 extends farther than the side portions 28 and 30.

The end portion 22 of the seat back cover 14 defines a hole 52 for receiving a support for a headrest 54. The support usually comprises a pair of rods (not shown). A cover 56 is also provided for the headrest 54 and includes an adhesive strip 58 to be secured to a like adhesive strip on the back cover 14.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An auto seat cover (14) comprising:

a cover portion (18) having first and second ends interconnected by side edges;

an end portion (22) extending about said first end and first (26) and second (30) side portions extending along said side edges of said cover portion (18), strap means interconnecting said second end of said cover portion (18) and said side portions (26, 30) for retaining said seat cover (14) in place on an auto seat, a buckle strap (34) and a buckle (36) attached to said buckle strap (34), a lap strap (38) having a free end (40) for threading through said buckle (36) and a working length (42) extending to said buckle (36) for tightening whereby said buckle strap (34) and said working length (42) of said lap strap (38) may be placed in tension by said buckle (36) to retain said seat cover (14) on the auto seat, and pile fastening structure (44) for securing said free end (40) of said lap strap (38) to said working length (42) of said lap strap (38) after said working length (42) of said lap strap (38) is placed in tension by said buckle (36), said pile fastening structure (44) including a plurality of pile loops on one of said working length (42) and said free end (40) of said lap strap (38) and a plurality of pile hooks on the other of said working length (42) and said free end (40) of said lap strap (38), said pile hooks being removably fastenable to said pile loops, said second end of said cover portion (18) defining a flap (46), and a U-shaped back portion (50) extending about said end portion (22) with legs extending along said side portions (28 and 32) to open ends, a pair of said buckle straps (34) and a pair of said buckles (36) with one of said buckle straps (34) attached to each of said open ends of said legs of said U-shaped portion (50).

2. An auto seat cover as set forth in claim 1 including a first of said lap straps (38) having said working length (42) thereof attached to said flap (46) and a second of said lap straps (38) having said working length (42) thereof attached to said flap (46) in spaced relationship to said first of said lap straps (38).

3. An auto seat cover as set forth in claim 2 wherein said cover portion (18) has an exterior surface, said working lengths (42) being attached to said exterior surface, and one of said hook and loop piles being disposed on each of said working lengths (42) and facing outwardly of said exterior surface of said cover portion (18).

4. An auto seat cover as set forth in claim 3 wherein said end portion (22) defines a hole (52) for receiving a headrest (54) support.

5. An auto seat cover as set forth in claim 3 for use as a seat back cover (14) and including a seat cushion cover (12) comprising a cushion cover portion (20) having first and second cushion ends interconnected by cushion side edges, a cushion end portion (24) extending about said first cushion end and first and second cushion side portions (28 and 32) extending along said cushion side edges of said cushion cover portion (20), said second cushion end defining a cushion flap (48) for extending through a crevice between the seat back (10) and seat cushion (12) of an auto seat assembly, a second pair of said buckles (36) and a second pair of said buckle straps (34) attached at spaced positions to said cushion flap (48) at said second cushion end of said cushion cover portion (20), and a second pair of said lap straps (38) with the third lap strap (38) having said working length (42) thereof attached to said first cushion side portion (28) and a forth of said lap straps (38) having said working length (42) thereof attached to said second cushion side portion (32), said cushion side portions (28 and 32) having exterior surfaces, said working lengths (42) of said second pair of lap straps (38) being attached to said exterior surfaces of said cushion side portions (28 and 32), and one of said hook and loop piles being disposed on each of said working lengths (42) and facing outwardly of said exterior surfaces of said cushion side portions.

6. An auto seat cover (14) comprising:

a cover portion (18) having first and second ends interconnected by side edges, an end portion (22) extending about said first end and first (26) and second (30) side portions extending along said side edges of said cover portion (18), said second end of said cover portion (18) defining a flap (46), a U-shaped back portion (50) extending about said end portion (22) with legs extending along said side portions (26) and 30) to open ends spaced from said flap (46), and strap means interconnecting said flap (46) at said second end of said cover portion (18) and said legs of said U-shaped back portion (50) for retaining said seat cover (14) in place on an auto seat back (10).

7. An auto seat cover as set forth in claim 6 wherein said strap means includes the combination of a buckle strap (34) and a buckle (36) attached to said buckle strap (34), a lap strap (38) having a free end (40) for threading through said buckle (36) and a working length (42) extending to said buckle (36) for tightening whereby said buckle strap (34) and said working length (42) of said lap strap (38) may be placed in tension to retain said seat cover (12 or 14) on the auto seat, and pile fastening structure (44) for securing said free end (40) of said lap strap (38) to said working length (42) of said lap strap (38).

8. An auto seat cover as set forth in claim 7 including a pair of said buckle straps (34) and a pair of said buckles (36) with one of said buckle straps (34) attached to each of said open ends of said legs of said U-shaped portion (50), a first of said lap straps (38) having said working length (42) thereof attached to said flap (46) and a second of said lap straps (38) having said working length (42) thereof attached to said flap (46) in spaced relationship to said first of said lap straps (38).

\* \* \* \* \*